United States Patent [19]
Kobayashi et al.

[11] Patent Number: 5,601,419
[45] Date of Patent: Feb. 11, 1997

[54] NOZZLE STRUCTURE FOR A FULL-CIRCUMFERENTIAL FLOW PUMP

[75] Inventors: Makoto Kobayashi; Masakazu Yamamoto; Yoshio Miyake; Tsuyoshi Maeda; Hiromi Sakacho; Koji Isemoto, all of Fujisawa, Japan

[73] Assignee: Ebara Corporation, Tokyo, Japan

[21] Appl. No.: 530,909

[22] Filed: Sep. 20, 1995

Related U.S. Application Data

[62] Division of Ser. No. 337,184, Nov. 7, 1994, Pat. No. 5,478,215, which is a division of Ser. No. 46,850, Apr. 14, 1993, Pat. No. 5,388,971.

[30] Foreign Application Priority Data

| Apr. 14, 1992 | [JP] | Japan | 4-120173 |
| Apr. 14, 1992 | [JP] | Japan | 4-120174 |
| Apr. 14, 1992 | [JP] | Japan | 4-120176 |
| Apr. 14, 1992 | [JP] | Japan | 4-120179 |
| Jun. 1, 1992 | [JP] | Japan | 4-165383 |
| Jun. 1, 1992 | [JP] | Japan | 4-165384 |
| Jun. 5, 1992 | [JP] | Japan | 4-171685 |

[51] Int. Cl.[6] ................................ F04B 39/12
[52] U.S. Cl. .................. 417/423.14; 417/366; 415/213.1
[58] Field of Search ..................... 417/360, 366, 417/423.14; 415/213.1; 29/888.025

[56] References Cited

U.S. PATENT DOCUMENTS

| 1,974,183 | 9/1934 | Gunderson | 417/366 |
| 3,910,715 | 10/1975 | Yedidiah | 417/423.14 |
| 4,900,224 | 2/1990 | Timperi et al. | 417/360 |
| 4,966,532 | 10/1990 | Fengsheng | 417/366 |
| 5,215,448 | 6/1993 | Cooper | 417/423.14 |

FOREIGN PATENT DOCUMENTS

| 69291 | 1/1952 | Netherlands | 417/366 |
| 2202586 | 9/1988 | United Kingdom | 417/366 |

Primary Examiner—John J. Vrablik
Assistant Examiner—William Wicker
Attorney, Agent, or Firm—Oblon, Spivak, McClelland, Maier & Neustadt, P.C.

[57] ABSTRACT

A full-circumferential flow pump has a circumferential fluid passage between a sheet metal pump casing and a motor provided in the pump casing. The full-circumferential flow pump comprises a suction-side casing having a suction nozzle, and an outer cylinder connected to the suction-side casing and accommodating the canned motor therein. The suction-side casing and the outer cylinder have flanges, respectively extending radially outwardly from an open ends thereof. The adjacent flanges of the suction-side casing and the outer cylinder are clamped by clamping flanges to connect the suction-side casing and the outer cylinder.

8 Claims, 14 Drawing Sheets

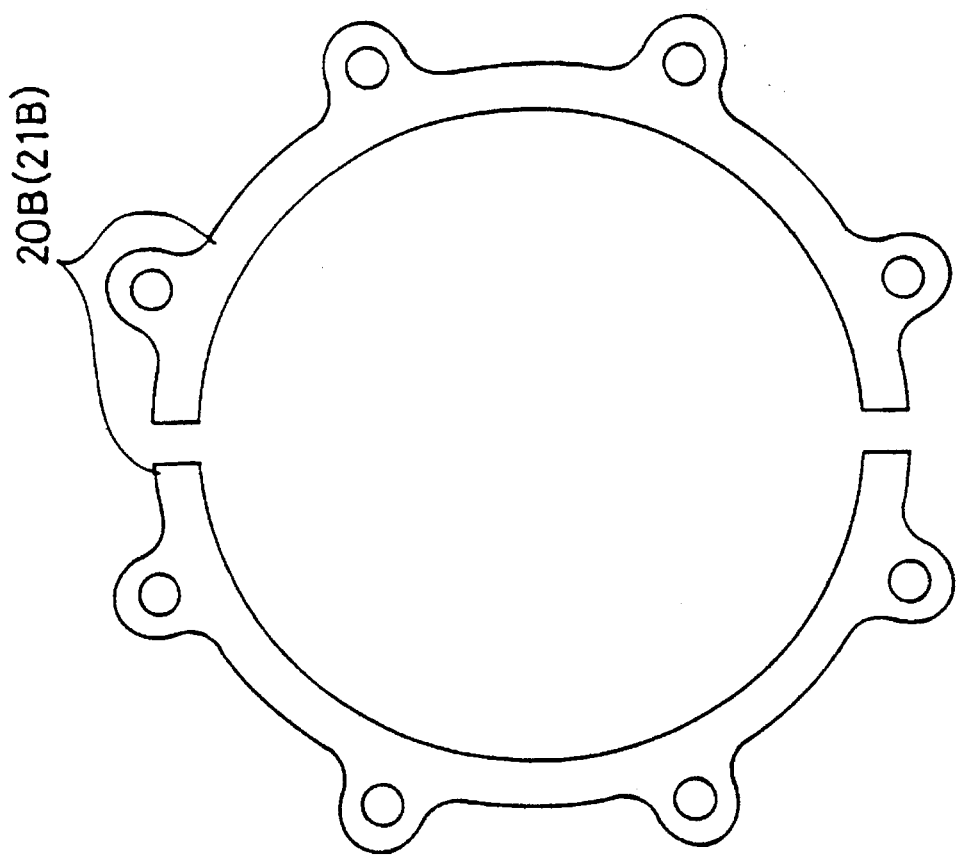
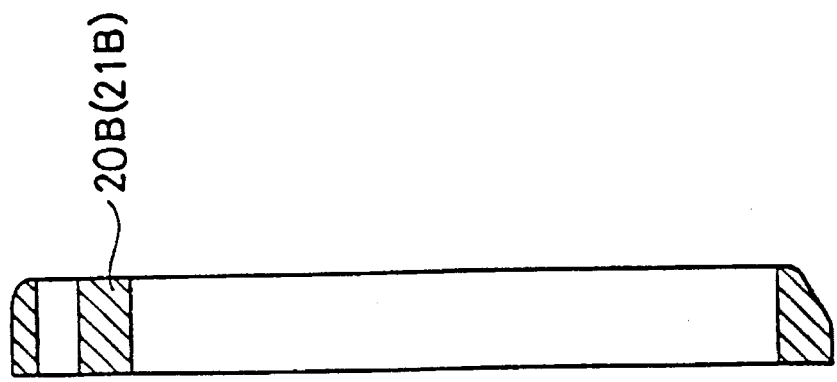

NOZZLE STRUCTURE FOR A FULL-CIRCUMFERENTIAL FLOW PUMP

This is a division of application Ser. No. 08/337,184 filed on Nov. 7, 1994, now U.S. Pat. No. 5,478,215, which is a division, of application Ser. No. 08/046,850 filed on Apr. 14, 1993, now U.S. Pat. No. 5,388,971.

BACKGROUND OF THE INVENTION

1. Field of the Invention

The present invention relates to a full-circumferential flow pump having a pump casing made of sheet metal, and more particularly to a full-circumferential flow pump having a pump casing which is made of sheet metal such as stainless steel plate and formed by press working.

It has been customary to press sheet steel such as stainless steel into a pump casing according to a deep drawing process. The pump casing has a casing flange, at the open end thereof, which extends radially outwardly and is formed integrally by press working. The casing flange has a plurality of bolt holes and is fixed to a holding member such as a bracket using bolts passing through the bolt holes, thereby holding the pump casing. The pressed casing flange must meet mechanical strength requirements for bearing an internal pressure developed in the pump casing, and also rigidity requirements for keeping a sealing surface stable. In conventional pressed pump casings, the casing flange has the same thickness as the pump casing body.

Inasmuch as the pressed pump casing is of a relatively flexible structure, however, it is impossible for the casing flange itself to satisfy both the mechanical strength requirements and the rigidity requirements. To achieve a desired level of rigidity of the casing flange, the conventional pressed pump casings have employed a steel sheet whose thickness is greater than the thickness required to withstand an internal pressure developed therein, or a cylindrical reinforcing portion folded from the outer circumferential edge of the casing flange and extending axially for reinforcing the casing flange, or a reinforcing member having a complex shape and made of the same material as the pump casing body.

As described above, the rigidity of the casing flange has been increased by employing either a steel sheet whose thickness is greater than the thickness required to withstand an internal pressure developed in the pump casing, or a reinforcing portion at the outer circumferential edge of the casing flange. The steel sheet of increased thickness is however difficult to press to shape.

On the other hand, in case of providing a reinforcing member of complex shape results in an increase in the cost of manufacture of the pump casing.

SUMMARY OF THE INVENTION

It is therefore an object of the present invention to provide a full-circumferential flow pump having a pump casing made of a metal-sheet whose thickness is not greater than necessary to withstand an internal pressure developed in the pump casing, and which has no reinforcing portion or reinforcing member for reinforcing the casing flange.

A full circumferential flow pump has a pump casing encasing a motor driving an impeller for pumping a fluid with a circumferential passage separating the pump casing and an outer circumferential surface of the rotor. The pump casing comprises a nozzle provided on the pump casing, the pump casing being made of sheet metal. A flange is detachably mounted on the nozzle and a seal surface is provided on an axial end of the nozzle for mating with another flange to be coupled to the detachably mounted flange. The detachably mounted flange does not contact liquid to be handled by the pump.

According to another feature of the invention, a pump having a pump casing encasing fluid to be handled by the pump comprises a nozzle provided on the pump casing, the pump casing being made of sheet metal, a flange detachably mounted on the nozzle and a seal surface provided on an axial end of the nozzle for mating with another flange to be coupled to the detachably mounted flange. The detachably mounted flange does not contact liquid to be handled by the pump.

BRIEF DESCRIPTION OF THE DRAWINGS

The above and other objects, features, and advantages of the present invention will become apparent from the following description when taken in conjunction with the accompanying drawings which illustrate preferred embodiments of the present invention by way of example, wherein:

FIG. 3(a) is a cross-sectional view of a flange provided on an outer cylinder shown in FIG. 1;

FIG. 3(b) is a side view of the flange provided on the outer cylinder shown in FIG. 1;

DETAILED DESCRIPTION OF THE PREFERRED EMBODIMENTS

A first embodiment of the present invention will be described below with reference to FIGS. 1 through 3.

Figure 1:
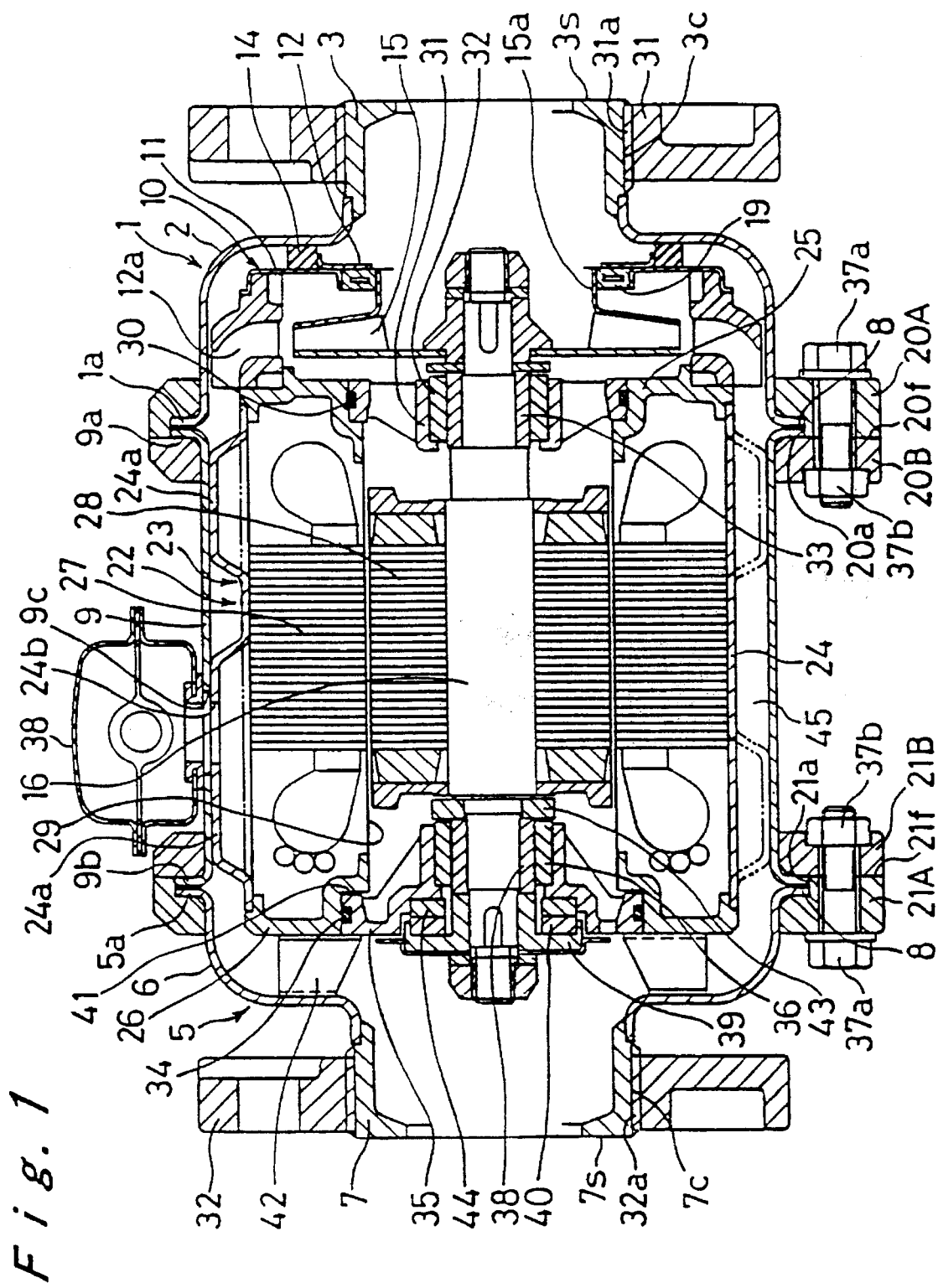
FIG. 1 is a cross-sectional view of a full-circumferential flow pump having a pump casing made of sheet metal according to a first embodiment of the present invention.

FIG. 1 shows in cross section a full-circumferential flow in-line pump having a pump casing made of sheet metal according to an embodiment of the present invention. As shown in FIG. 1, the full-circumferential flow in-line pump generally comprises a suction-side casing 1, a discharge-side casing 5, and an outer cylinder 9 interconnecting the suction-side casing 1 and the discharge-side casing 5. The suction-side casing 1, the discharge-side casing 5, and the outer cylinder 9 are in the form of pressed sheets such as stainless steel. The suction-side casing 1, the discharge-side casing 5, and the outer cylinder 9 have respective flanges 1a, 5a, 9a, 9b extending radially outwardly from open ends thereof. The adjacent flanges 1a, 9a of the suction-side casing 1 and the outer cylinder 9 are clamped by flanges 20A, 20B in the form of castings such as iron castings, and securely fastened to each other by bolts 37a and nuts 37b which join the flanges 20A, 20B. A resilient seal 8 made of rubber or the like is interposed between the flanges 1a, 9a. Similarly, the adjacent flanges 5a, 9a of the discharge-side casing 5 and the outer cylinder 9 are clamped by flanges 21A, 21B in the form of castings such as iron castings, and securely fastened to each other by bolts 37a and nuts 37b which join the flanges 21A, 21B. A resilient seal 8 made of rubber or the like is interposed between the flanges 5a, 9b. The suction-side casing 1, the discharge-side casing 5, and the outer cylinder 9 jointly serve as a pump casing made of sheet metal, which houses a canned motor 22.

The flanges 20A and 21A provided on the suction- and discharge-side casings are composed of integral member. The flanges 20A, 21A have a recess 20a, 21a, respectively in which the flanges 1a, 9a; 5a, 9b are accommodated. When the flanges 20A, 20B and 21A, 21B are fastened with each other, flange surfaces 20f, 21f thereof contact with each other. Thus, the interference of the resilient seal 8 is maintained at a constant level in cooperation with the recesses 20a, 21a. Further, the flange 20A is fitted over the suction-side casing by tight fit so that the flange 20A is not disengaged easily from the suction-side casing 1. Similarly, the flange 21A is fitted over the discharge-side casing 5 by tight fit so that the flange 21A is not disengaged easily from the discharge-side casing 5.

Each of the flanges 20B, 21B is composed of two separable flange members as shown in FIGS. 3 (a) and 3(b). The flanges 20B, 21B are integrally assembled when clamping the flanges 1a, 9a; 5a, 9b.

The suction-side casing 1 comprises a substantially cylindrical cup-shaped body 2 and an annular suction nozzle 3 extending axially into a suction region from the cylindrical cup-shaped body 2. Similarly, the discharge-side casing 5 comprises a substantially cylindrical cup-shaped body 6 and an annular discharge nozzle 7 extending axially into a discharge region from the cylindrical cup-shaped body 6. The suction nozzle 3 and the discharge nozzle 7 define respective suction and discharge ports that are positioned axially in line with each other.

The full-circumferential flow in-line pump also has an inner casing 10 disposed radially inwardly of the suction-side casing 1. The inner casing 10 comprises a partition plate 11 made of sheet metal at the suction region and a guide device 12 which is connected to the partition plate 11 and serves as guide vanes or a volute. The guide device 12 is fitted over a motor frame 23 of the canned motor 22 in a socket-and-spigot joint. The motor frame 23 of the canned motor 22 is of a high rigid structure pressed from a sheet and the guide device 12 is supported on the motor frame 23 of the canned motor 22. As a result, the inner casing 10 is supported by the highly rigid motor frame 23 of the canned motor 22. A resilient seal 14 is disposed between the inner casing 10 and the suction-side casing 1 to seal a suction side (low-pressure side) in the pump from a discharge side (high-pressure side) in the pump.

The full-circumferential in-line pump also has an impeller 15 rotatably disposed in the inner casing 10. The impeller 15 is coupled to and supported by a free axial end of a main shaft 16 coupled to the canned motor 22. A liner ring 19 is supported by the partition plate 11 of the inner casing 10, with a slight clearance defined between the liner ring 19 and a suction-side axial end 15a of the impeller 15.

Suction and discharge flanges 31, 32 are fixed respectively to the suction nozzle 3 and the discharge nozzle 7. Each of the suction and discharge nozzles 3, 7 is made of the same material, such as stainless steel, as the pump casing, and has an externally threaded surface 3c, 7c and a front end surface 3s, 7s serving as a seal surface for mating with another flange (not shown) to be coupled to the suction or discharge flange. The suction and discharge flanges 31, 32 are made of a material such as cast iron (FC) or the like, which is different from the material of the pump casing, and have internally threaded surfaces 31a, 32a, respectively. Thus, the suction and discharge flanges 31, 32 are fastened to the suction and discharge nozzles 3, 7, respectively through threaded engagement.

Figure 2:
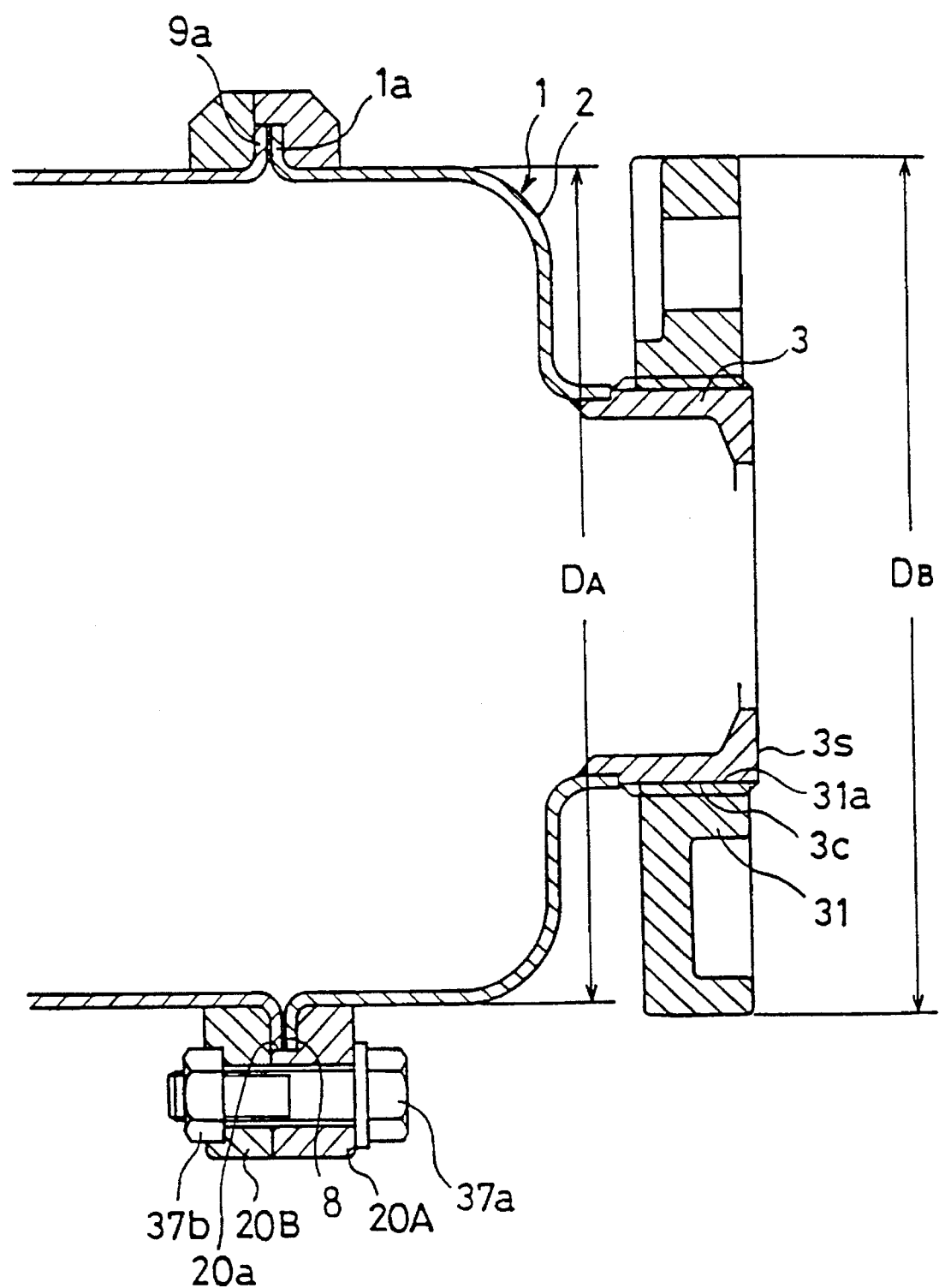
FIG. 2 is an enlarged detailed cross-sectional view of a pump casing shown in FIG. 1.

In FIG. 2, the flange 20A (or 21A) comprises an integral member. In the case where the inner diameter $D_A$ of the flange 20A (or 21A) is smaller than the outer diameter $D_B$ of the suction flange 31 (or discharge flange 32), the flange 20A (or 21A) cannot be detached from the pump casing because of existence of the suction flange 31 (or discharge flange 32). Therefore, the suction flange 31 (or discharge flange 32) is detached from the suction nozzle 3 (or discharge nozzle 7) in the first plate, then the flange 20A (or 21A) is detached from the suction-side casing 1 (or discharge-side casing 5). When assembling, the flange 20A (or 21A) is attached to the suction-side casing 1 (or discharge-side casing 5), then the suction flange 31 (or discharge flange 32) is attached to the suction nozzle 3 (or discharge nozzle 7).

The motor frame 23 of the canned motor 22 comprises a cylindrical frame outer barrel 24, frame side plates 25, 26 provided on both sides of the frame outer barrel 24. The frame outer barrel 24 has a plurality of ribs 24a projecting radially outwardly from an outer circumferential surface thereof. The ribs 24a are integrally formed with the motor frame outer barrel 24 by embossing, and have outer surfaces fitted in and spot-welded or otherwise joined to the outer cylinder 9 of the pump casing.

One of the ribs 24a has a lead hole 24b through which leads of the motor 22 extend. The leads also extend through an opening 9c defined in the outer cylinder 9 into a terminal box 38 that is fixed to the outer cylinder 9.

The canned motor 22 has a stator 27 and a rotor 28 that are disposed in the motor frame outer barrel 24. The rotor 28 is supported on the main shaft 16 and disposed radially inwardly of the stator 27. A cylindrical can 29 is fitted in the stator 27, which is fixedly positioned in the motor frame outer barrel 24. A bearing housing 31 is detachably fastened to the frame side plate 25 with a resilient O-ring 30 being interposed between the bearing housing 31 and the frame side plate 25. The bearing housing 31 and the frame side plate 25 are joined to each other by a socket-and spigot joint with a clearance fit with the O-ring 30 disposed therein. A radial bearing 32 is supported by the bearing housing 31 to support a shaft sleeve 33 fitted over the main shaft 16.

A bearing housing 35 is detachably fastened to the frame side plate 26 with a resilient O-ring 34 being interposed between the bearing housing 35 and the frame side plate 26. The bearing housing 35 and the frame side plate 26 are joined to each other by a socket-and spigot joint with a clearance fit with the O-ring 40 disposed therein. The bearing housing 35 is also prevented from being axially dislodged from the frame side plate 26 by a holder plate 42 fixed to the discharge-side casing 5. A resilient member 41 such as rubber is disposed in an axial gap between the bearing housing 35 and the frame side plate 26. The bearing housing 35 supports a radial bearing 36 on its radially inner surface and a stationary thrust bearing 44 on its axially outer surface. A shaft sleeve 38 fitted over an opposite end portion of the main shaft 16 is rotatably supported by the radial bearing 36.

Two thrust disks 39, 43 are fixedly mounted to the opposite end portion, i.e., a discharge-side end portion, of the main shaft 16 in axially sandwiching the bearing housing 35. The thrust disk 43 is rotatable with the main shaft 16 and faces an axially inner end surface of the radial bearing 36 which provides a stationary thrust sliding surface. The thrust disk 39 holds a thrust bearing 40 rotatable with the main shaft 16 and facing an axially outer end surface of the stationary thrust bearing 44.

The full-circumferential flow in-line pump shown in FIGS. 1 through 3 operates as follows: A fluid drawn from the suction nozzle 3 flows through the inner casing 10 into the impeller 15. The fluid is then radially outwardly discharged by the impeller 15, and directed by the guide device 12 to flow axially through an annular fluid passage 45 radially defined between the outer cylinder 9 and the motor frame outer barrel 24 of the canned motor 22. The fluid then flows from the passage 45 into the discharge casing 5. Thereafter, the fluid is discharged from the discharge nozzle 7 that is connected to the discharge casing 5.

In the above embodiment, the suction-side casing 1, the discharge-side casing 5, and the outer cylinder 9 have respective flanges 1a, 5a, 9a, 9b extending radially outwardly from open ends thereof. The adjacent flanges 1a, 9a of the suction-side casing 1 and the outer cylinder 9 are clamped by the flanges 20A, 20B, and securely fastened to each other by the bolts 37a and the nuts 37b which join the flanges 20A, 20B. Similarly, the adjacent flanges 5a, 9b of the discharge-side casing 5 and the outer cylinder 9 are clamped by the flanges 21A, 21B, and securely fastened to each other by the bolts 37a and the nuts 37b which join the flanges 21A, 21B. The pump casing including the suction-side casing 1 and the discharge-side casing 5 may be of a thickness just large enough to withstand an internal pressure developed therein, and does not need to be reinforced by a special reinforcing portion or member. Accordingly, the pump casing can easily be pressed to desired shape, with the result that the pump casing can be produced with high productivity. As the pump casing require no reinforcing member, the number of parts of the pump casing is relatively small, and the cost of the pump casing is low. The maximum diameter of the pump casing becomes small to thus achieve material-saving.

Even if the pump casing is manufactured by stainless steel in consideration of corrosion resistance, the flanges 20A, 20B, 21A, 21B do not need to use expensive stainless steel because they do not contact liquid to be pumped. Accordingly, the total cost for manufacturing a pump is low. Further, the recesses 20a, 21a formed on the flanges 20A, 21A for accommodating the flanges 1a, 5a, 9a, 9b prevent the pump casing from getting out of position by external force.

Next, a pump casing with a mechanism for preventing a pump casing from rotating will be described in detail with reference to FIGS. 4 and 5.

Figure 4:
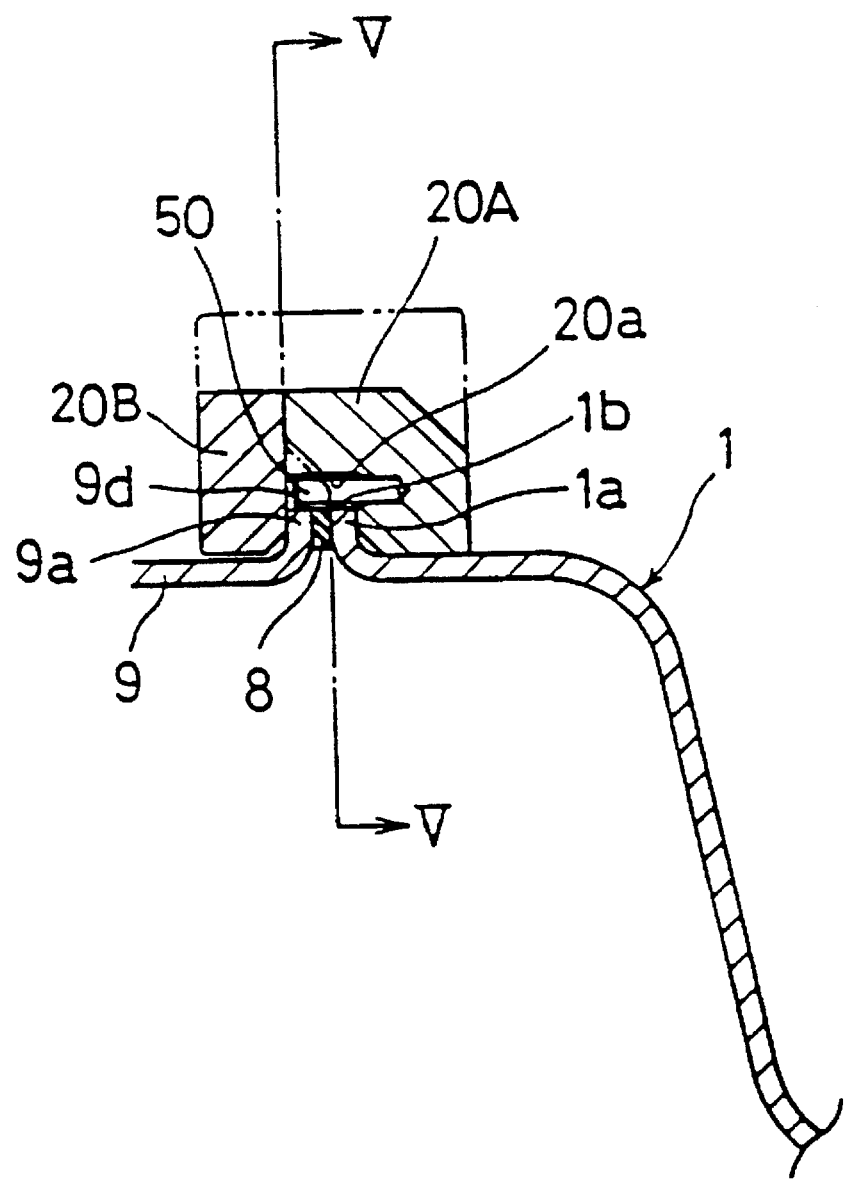
FIG. 4 is a cross-sectional view of a pump casing with a mechanism for preventing the casing from rotating according to the first embodiment of the present invention.
Figure 5:
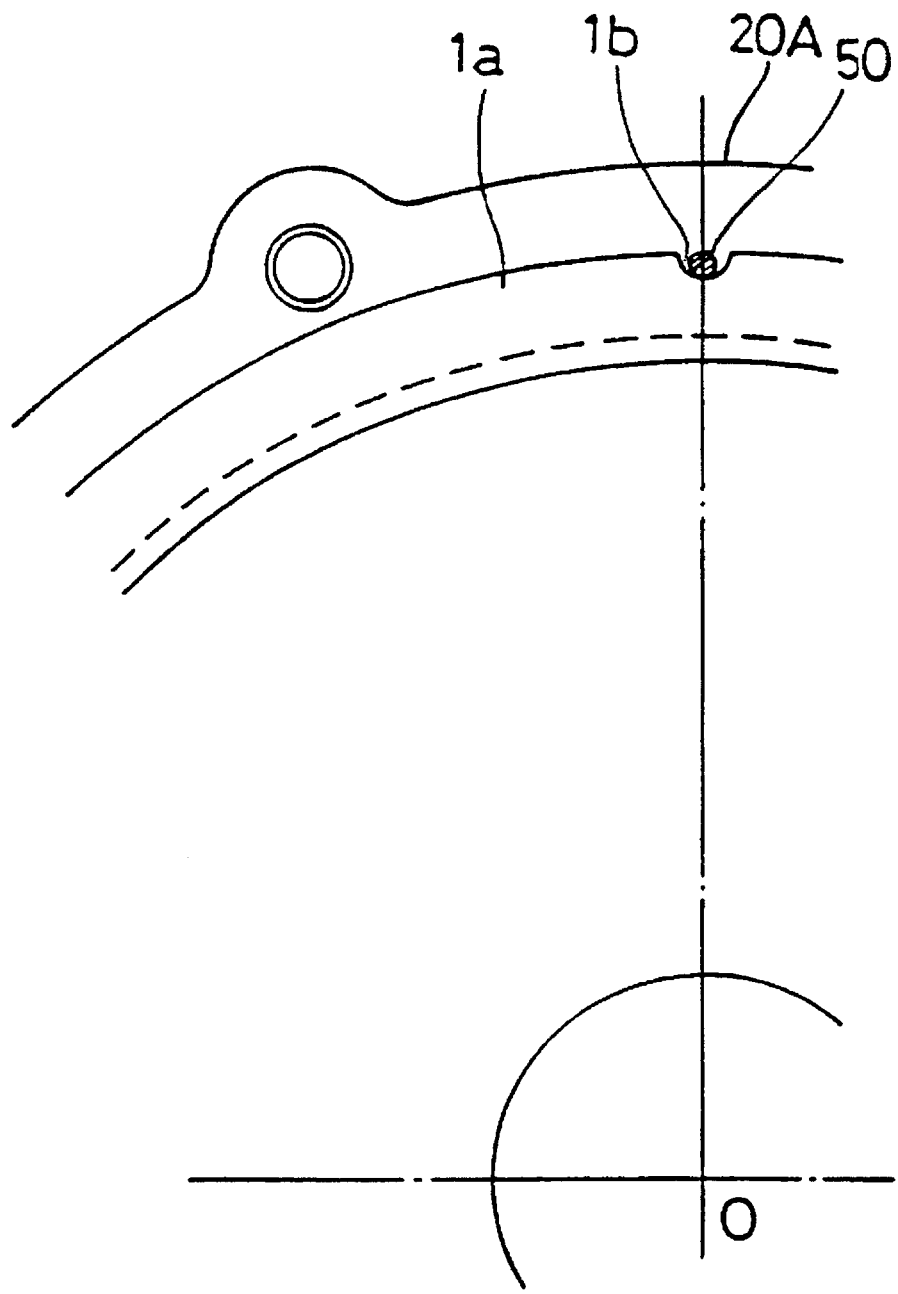
FIG. 5 is a cross-sectional view taken along line V—V of FIG. 4.

As shown in FIGS. 4 and 5, the flange 20A is provided with a pin 50 horizontally fixed thereon. The flange 1a of the suction-side casing 1 has an outer periphery with a notch 1b. Similarly, the flange 9a of the outer cylinder 9 has an outer periphery with a notch 9d. The pin 50 is engaged with the notch 1b and the notch 9d, thus preventing the suction-side casing 1 from rotating. The pin 50 is positioned in the recess 20a and does not project from the flange 20A, resulting in easy assembling.

Figure 6:
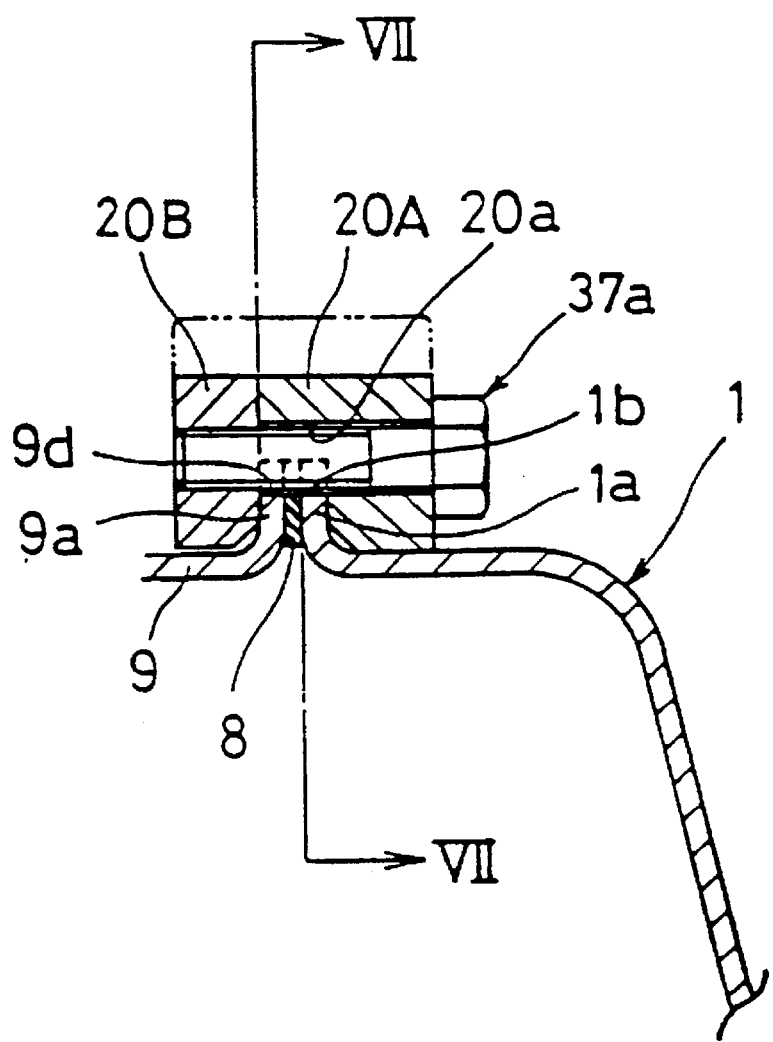
FIG. 6 is a cross-sectional view of a pump casing with a mechanism for preventing the pump casing from rotating according to a modified embodiment of the present invention.
Figure 7:
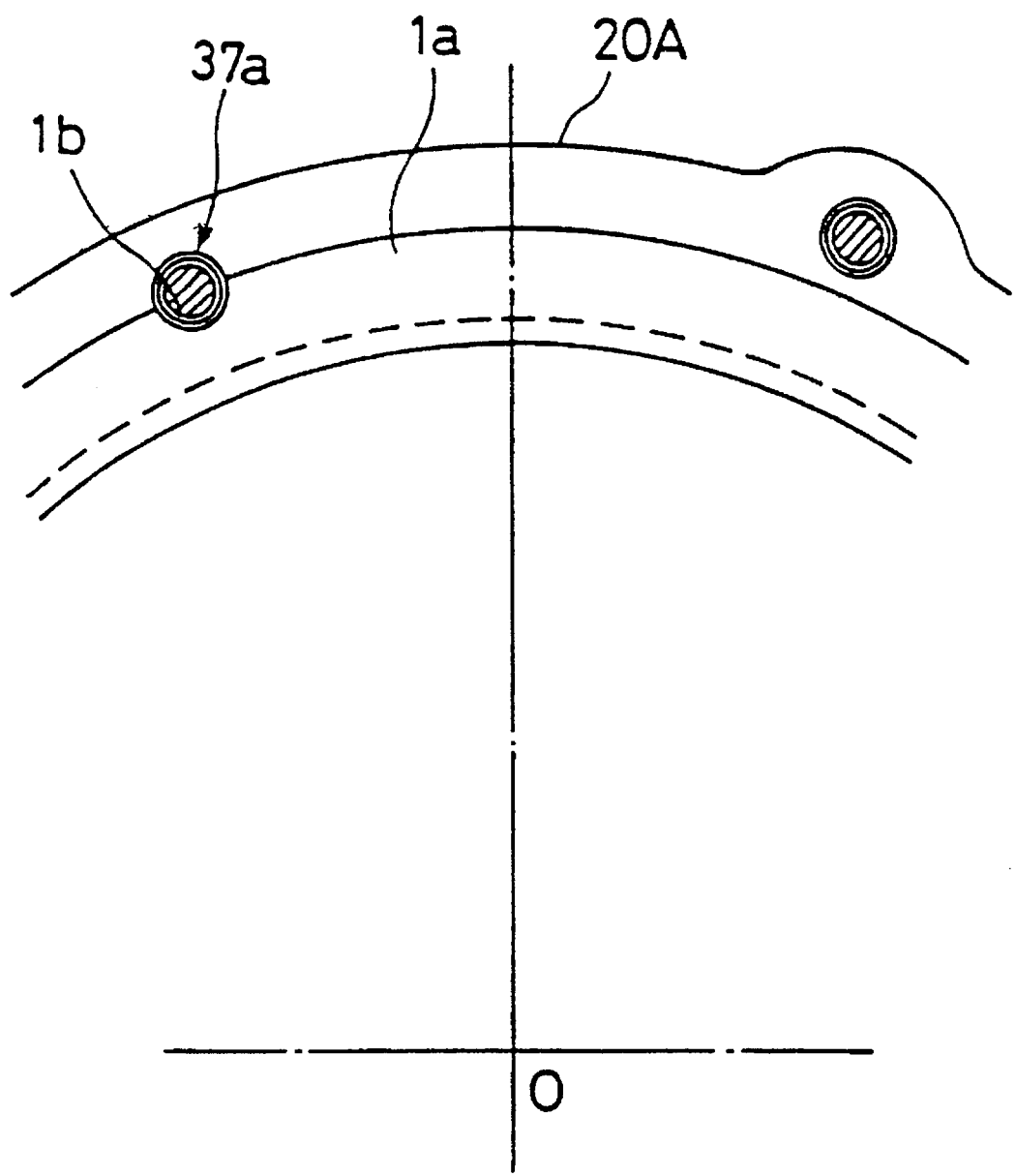
FIG. 7 is a cross-sectional view taken along line VII—VII of FIG. 6.

FIGS. 6 and 7 show a pump casing with a mechanism for preventing a pump casing from rotating according to a modified embodiment of the present invention.

As shown in FIGS. 6 and 7, the flange 1a of the suction-side casing 1 has an outer periphery with a notch 1b. Similarly, the flange 9a of the outer cylinder 9 has an outer periphery with a notch 9d. The fastening bolt 37a for fastening the flanges 20A, 20B is engaged with the notch 1b and the notch 9d, thus preventing the suction-side casing 1 from rotating.

In the embodiments shown in FIGS. 4 through 7, the suction-side casing 1 is shown and described, however the mechanism for preventing the pump casing from rotating is applicable to the discharge-side casing 5.

Figure 8:
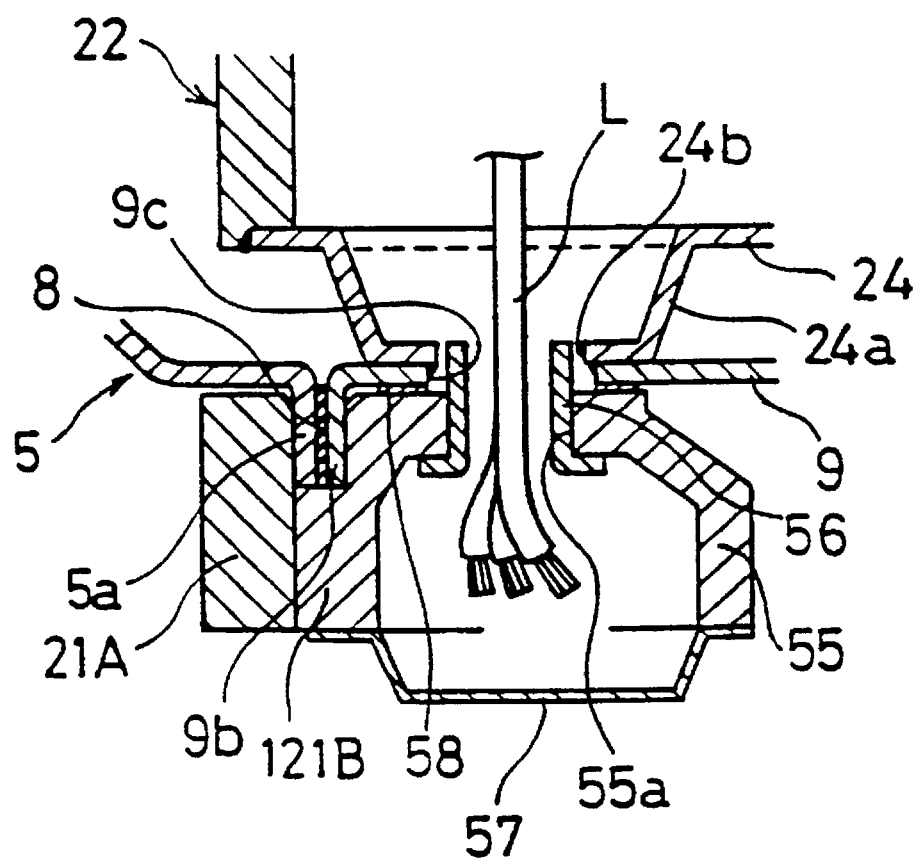
FIG. 8 is a cross-sectional view of a pump casing with a terminal box according to a second embodiment of the present invention.

FIG. 8 shows a flange with a terminal box according to a second embodiment of the present invention. In this embodiment, a flange 121B is integrally provided with a terminal box 55. The flange 121B has such structure as a terminal box 55 is added to the flange 21B shown in FIG. 1. The terminal box 55 has an opening 55a into which a bush 56 is fitted. The tip end of the bush 56 is inserted into the opening 9c of the outer cylinder 9. Leads L are taken out of the canned motor 22 through the lead hole 24b of the rib 24a and drawn into the terminal box 55 through the bush 56. The terminal box 55 is covered with a lid 57. A gasket 58 is interposed between the outer cylinder 9 and the terminal box 55 to prevent dew condensed onto the outer cylinder 9 from entering the terminal box 55 and the canned motor 22.

According to this embodiment, the terminal box 55 is not required to be attached to the outer cylinder 9 of the pump casing by welding or the like. In this embodiment, the flange 121B provided on the outer cylinder 9 adjacent to the discharge-side casing 5 is integrally provided with the terminal box 55. However, a flange 20B provided on the outer cylinder 9 adjacent to the suction-side casing 1 in FIG. 1 may be provided with a terminal box.

Figure 9:
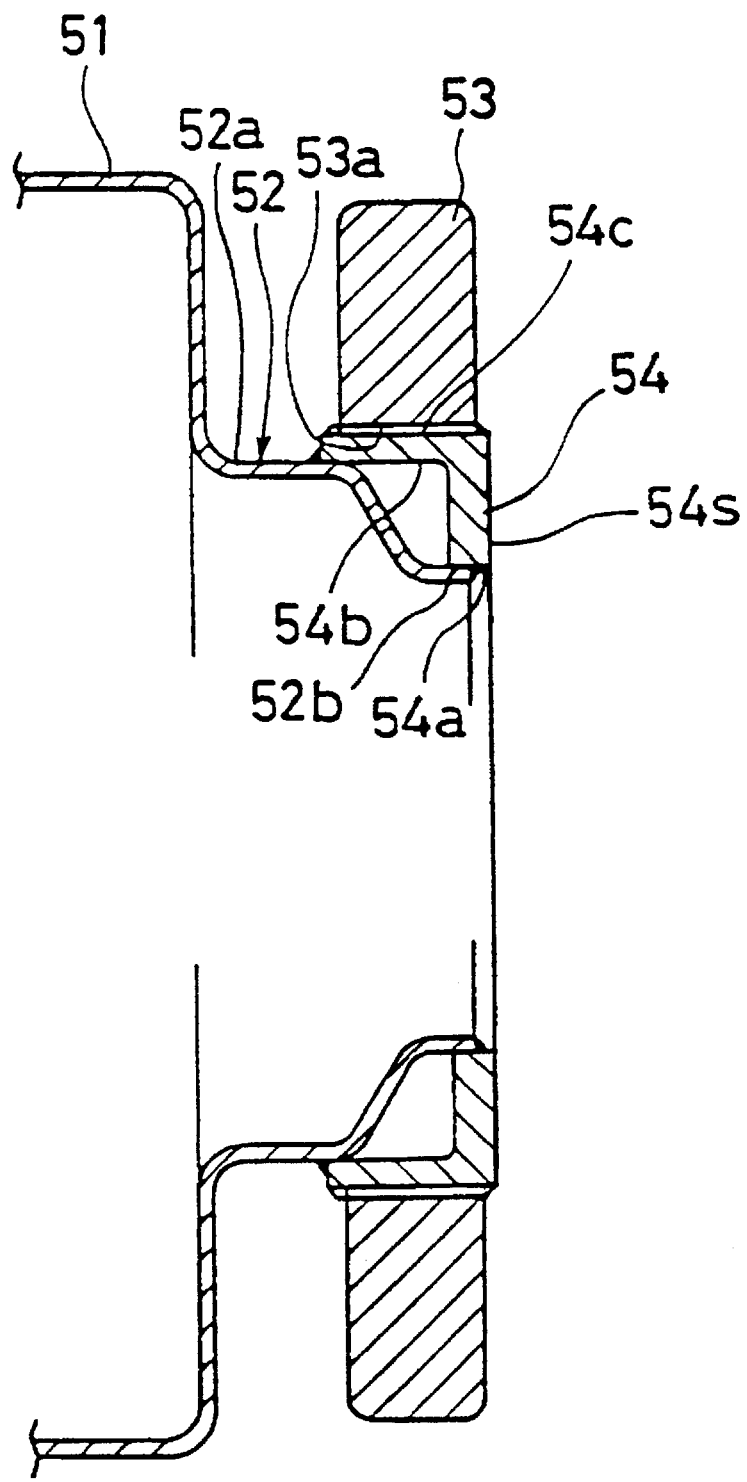
FIG. 9 is a cross-sectional view of a pump casing with a suction flange according to a third embodiment of the present invention.

FIG. 9 shows a suction flange according to a third embodiment of the present invention. In this embodiment, a suction-side casing 51 is integrally provided with a suction nozzle 52. A suction flange 53 is fixed to a suction nozzle 52 through an intermediate ring 54. The intermediate ring 54 is made of the same material, such as stainless steel, as the pump casing, and has a central opening 54a, an annular recess 54b, and an externally threaded surface 54c. The intermediate rings 54 has a front end surface 54s serving as a seal surface for mating with another flange (not shown) to be coupled to the suction flange 53. The suction nozzle 52 has a smaller-diameter potion 52b inserted into the opening 54a of the intermediate ring 54 and welded thereto. The suction nozzle 52 also has a larger-diameter portion 52a fitted in the recess 54b of the intermediate ring 54 in a socket-and-spigot joint and welded thereto. The suction flange 53 is made of a material such as cast iron (FC) or the like, which is different from the material of the pump casing, and has an internally threaded surface 53a that is threaded over the externally threaded surfaces 54c of the intermediate ring 54. Thus, the suction flange 53 is fastened to the intermediate ring 54 through threaded engagement.

According to this embodiment, the suction flange 53 is connected to the suction nozzle 52 through the intermediate ring 54. The suction flange 53 can be manufactured by the process other than press working to thus improve its rigidity.

Even if the pump casing is manufactured by stainless steel in consideration of corrosion resistance, the suction flange 53 does not need to use expensive stainless steel because the flange 53 does not contact liquid to be pumped. Accordingly, the total cost for manufacturing a pump is low.

Figure 10:
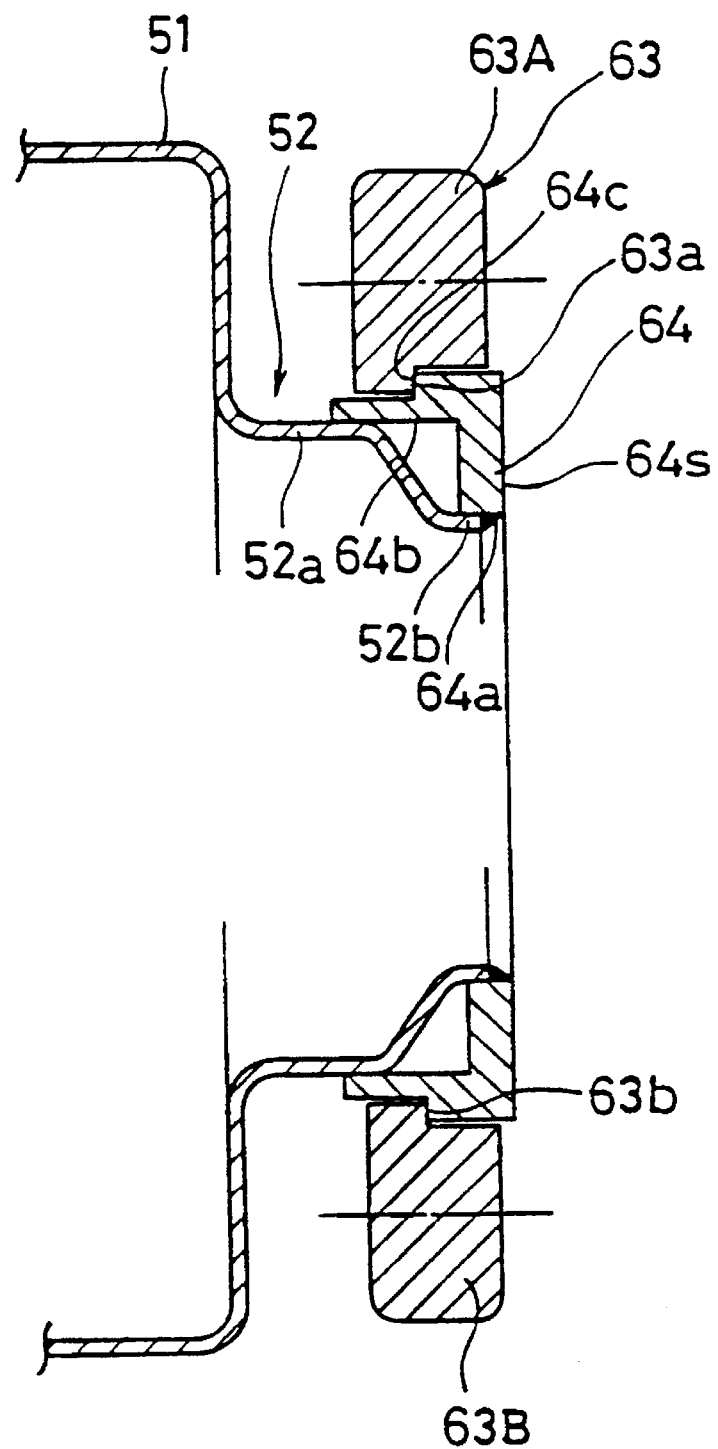
FIG. 10 is a cross-sectional view of a pump casing with a suction flange according to a modified embodiment of the present invention.
Figure 11:
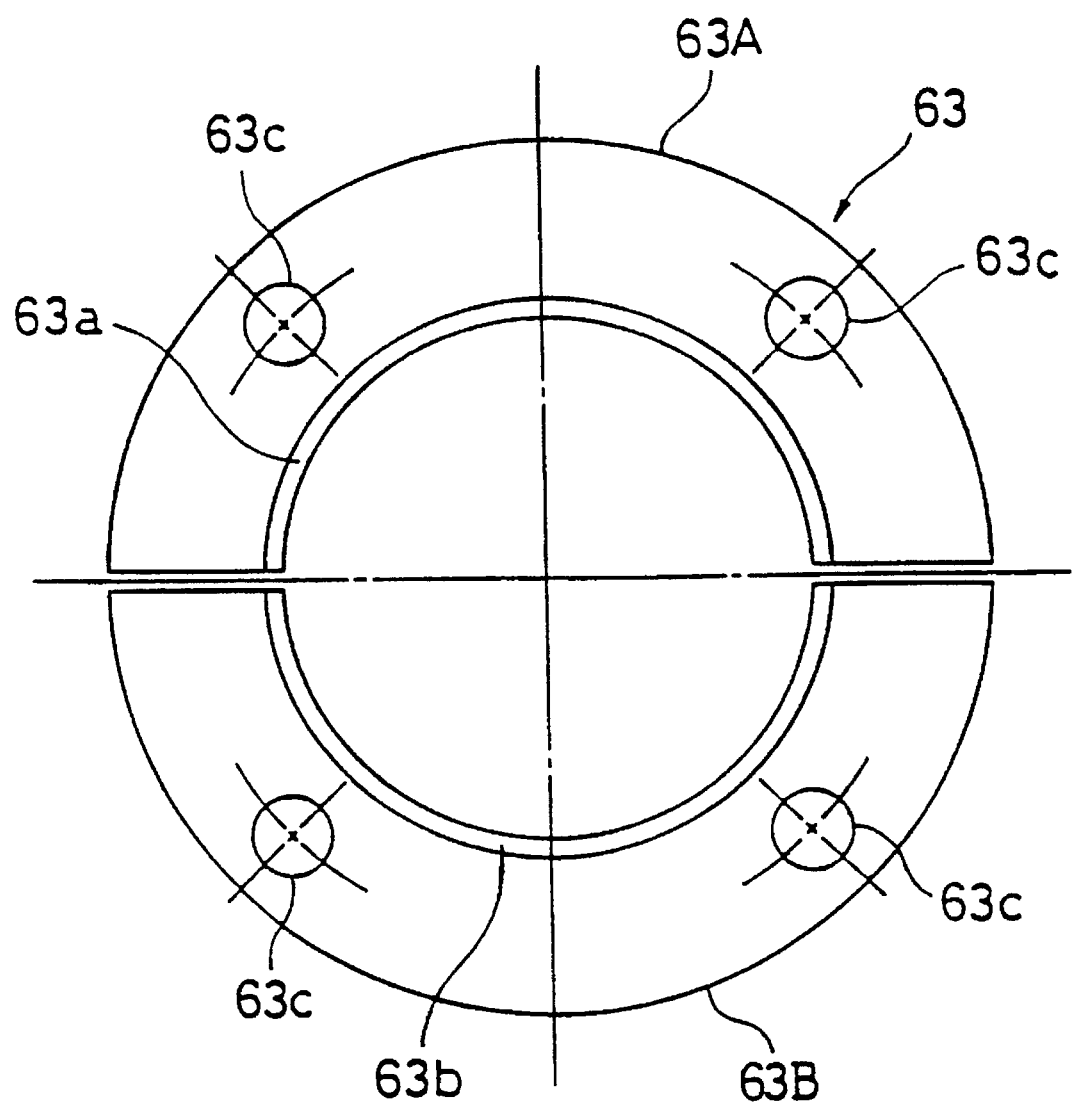
FIG. 11 is a side view of the suction flange shown in FIG. 10.

FIGS. 10 and 11 show a suction flange according to a modified embodiment of the present invention. A suction-side casing of this embodiment is the same as the suction-side casing 51 in FIG. 9. An intermediate ring 64 connected to the suction nozzle 52 does not have an externally threaded surface, but has an engaging portion 64c. The intermediate ring 64 has a central opening 64a, an annular recess 64b and a front end surface 64s. A suction flange 63 is composed of two separable flange member 63A, 63B each having a semicircular ring shape as shown in FIG. 11. Each of flange members 63A, 63B has an engaging surface 63a, 63b engageable with the engaging portion 64c of the intermediate ring 64 shown in FIG. 10. According to this embodiment, the suction flange 63 can be attached to the intermediate ring 64 after the intermediate ring 64 is bonded to the suction nozzle 52. The intermediate ring 64 is made of the same material such as stainless steel, as the pump casing. The suction flange 63 is made of a material such as cast iron or the like, which is different from the material of the pump casing. Reference numerals 63c denote a bolt hole for fixing the suction flange 63 to another flange (not shown).

In a flange structure shown in FIGS. 9 through 11, only a suction flange is shown and described, however, this flange structure is applicable to a discharge flange as well.

Next, a full-circumferential flow pump having legs for supporting the pump will be described with reference to FIGS. 12 through 14.

Figure 12:
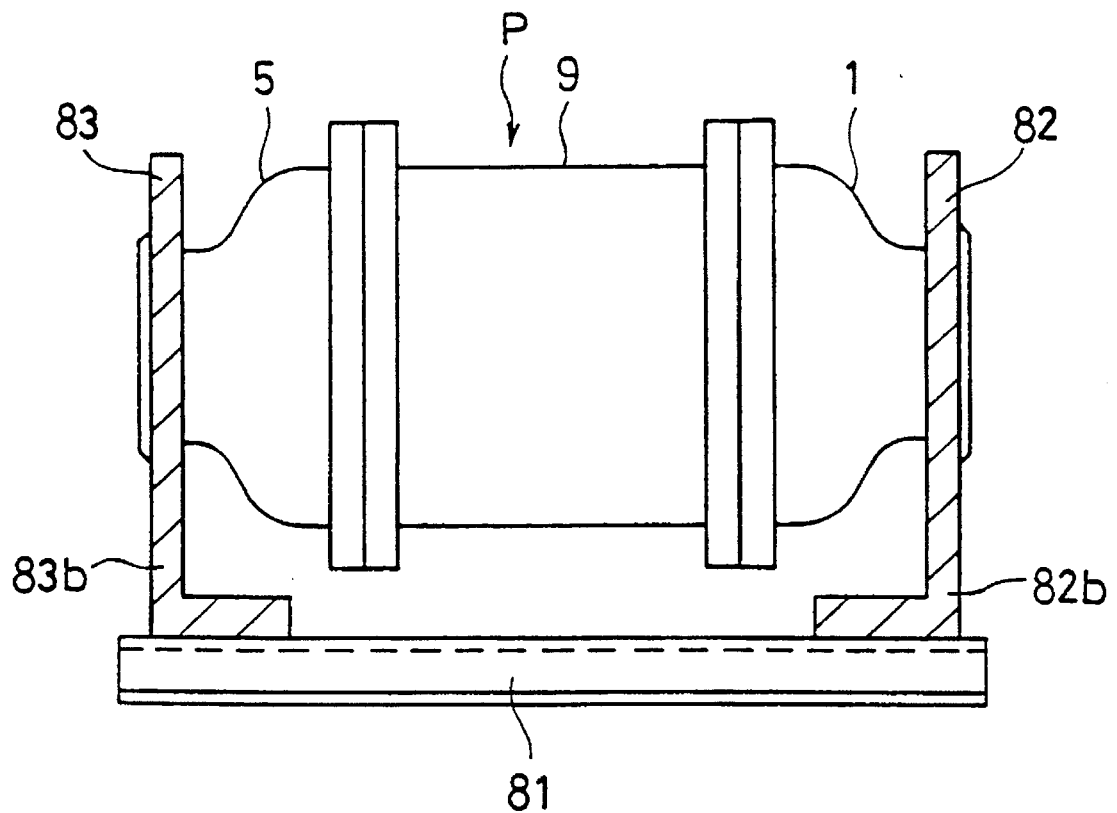
FIG. 12 is a front view of a full-circumferential flow in line pump with a leg according to a fourth embodiment of the present invention.
Figure 13:
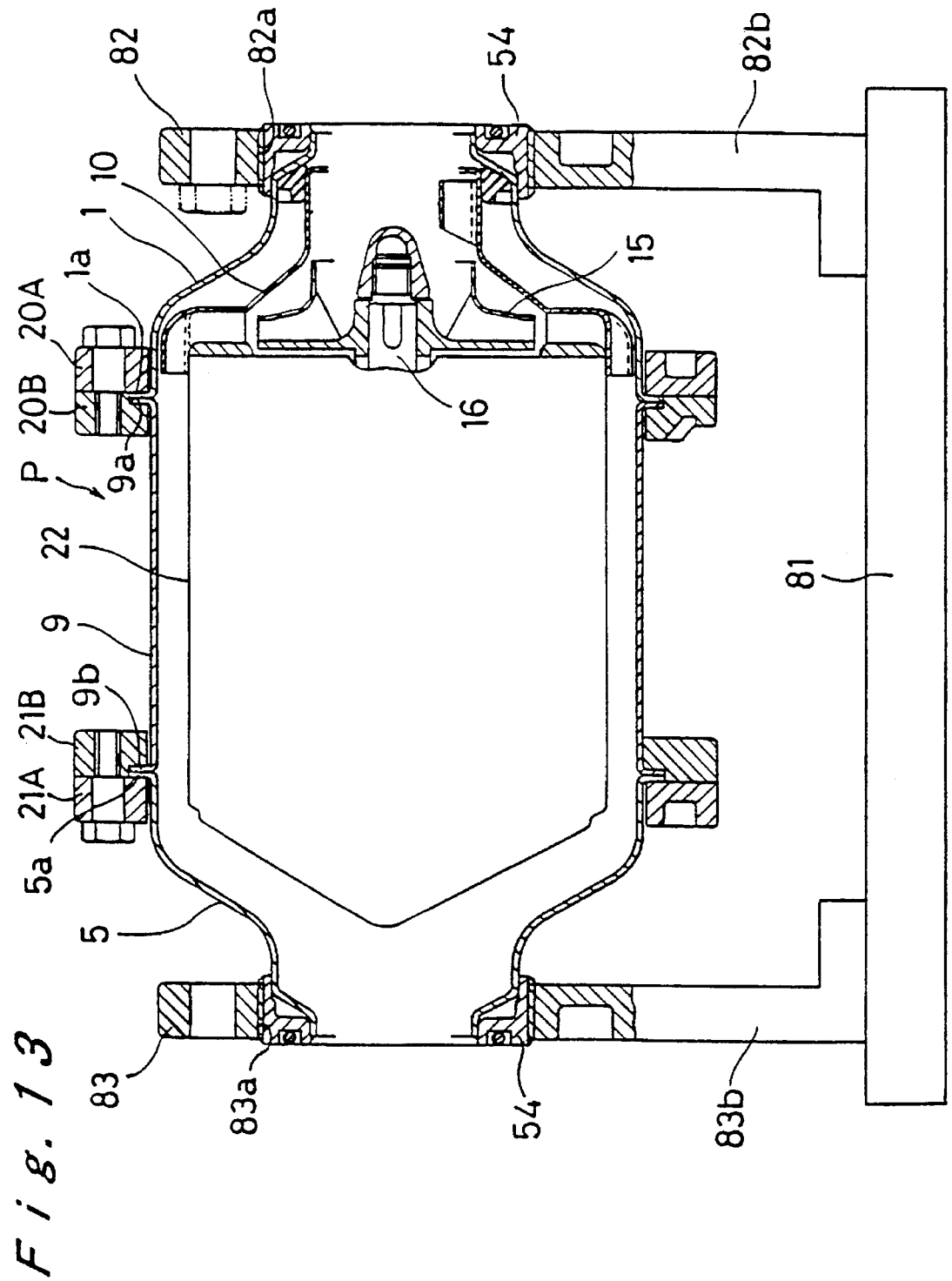
FIG. 13 is a cross-sectional view of a full-circumferential flow in line pump shown in FIG. 12.

As shown in FIGS. 12 and 13, a full-circumferential flow in-line pump P is fixed to a base 81 through a suction flange 82 with a leg and a discharge flange 83 with a leg. The full-circumferential flow in-line pump P in FIGS. 12 has almost the same structure as the full-circumferential flow in-line pump shown in FIG. 1, therefore the interior structure of the pump will not be described.

The suction flange 82 has a female screw 82a, at the upper portion thereof, threaded with the intermediate ring 54, and a leg 82b extending downwardly and fixed to the base 81 as shown in FIG. 13. The discharge flange 83 has a female screw 83a, at the upper portion thereof, threaded with the intermediate ring 54, and a leg 83b extending downwardly and fixed to the base 81. The suction and discharge flanges 82 and 83 are made of a material such as cast iron (FC) or the like, which is different from the material of the pump casing.

In the above embodiment, external forces such as piping force are transmitted to the suction and discharge flanges 82, 83, and then to the base 81 through the legs 82a, 83a. Therefore, external forces such as piping force are not transmitted to the suction- and discharge- side casings 1, 5.

Figure 14:
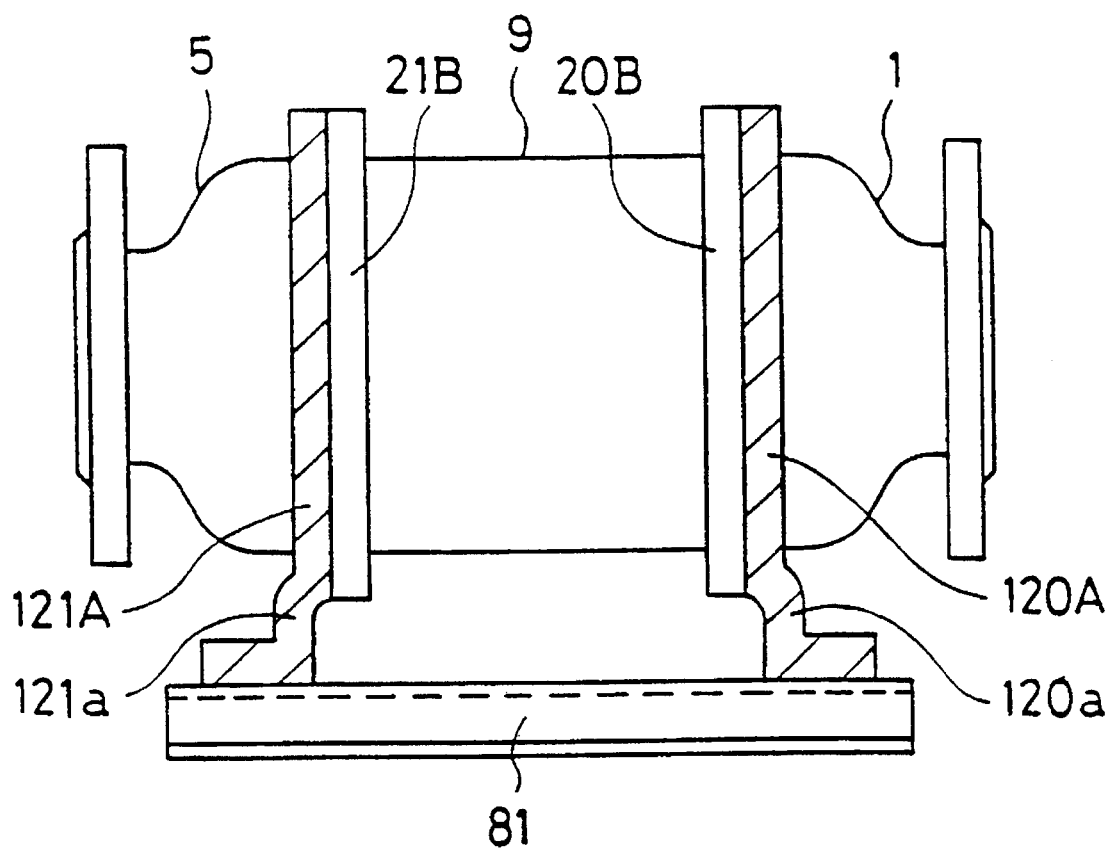
FIG. 14 is a front view of a full-circumferential flow in line pump with a leg according to a modified embodiment of the present invention.

FIG. 14 shows another embodiment of a full-circumferential flow pump having legs. As shown in FIG. 14, a full-circumferential flow in-line pump P is fixed to a base 81 through a flange 120A with a leg and a flange 121A with a leg. The full-circumferential flow in-line pump P in FIG. 14 has the same structure as the full-circumferential flow in-line pump shown in FIGS. 1 and 2. The flange 120A has such structure as a leg is added to the flange 20A shown in FIGS. 1 and 2. That is, the flange 120A has a flange body for clamping the flanges of the suction-side casing 1 and the outer cylinder 9, and a leg 120a extending downwardly from the flange body and fixed to the base 81. Similarly, the flange 121A has such structure as a leg is added to the flange 21A shown in FIGS. 1 and 2. That is, the flange 121A has a flange body for clamping the flanges of the discharge-side casing 5 and the outer cylinder 9, and a leg 121a extending downwardly from the flange body and fixed to the base 81.

Although certain preferred embodiments of the present invention have been shown and described in detail, it should be understood that various changes and modifications may be made therein without departing from the scope of the appended claims.

What is claimed as new and desired to be secured by Letters Patent of the United States is:

1. A pump having a pump casing encasing fluid to be handled by the pump, said pump casing comprising:

a nozzle provided on said pump casing, said pump casing being made of sheet metal;

a flange detachably mounted on said nozzle; and a seal surface provided on an axial end of said nozzle for mating with another flange to be coupled to said detachably mounted flange;

wherein said detachably mounted flange does not contact liquid to be handled by the pump.

2. The pump according to claim 1, wherein said seal surface is formed on said nozzle.

3. The pump according to claim 1, further comprising an intermediate ring interposed between said nozzle and said detachably mounted flange, wherein said seal surface is formed on said intermediate ring.

4. The pump according to claim 1, wherein said detachably mounted flange has a rigidity greater than that of said pump casing.

5. A full circumferential flow pump has a pump casing encasing a motor driving an impeller for pumping a fluid with a circumferential passage separating the pump casing and an outer circumferential surface of said motor, said pump casing comprising:

a nozzle provided on said pump casing, said pump casing being made of sheet metal;

a flange detachably mounted on said nozzle; and a seal surface provided on an axial end of said nozzle for mating with another flange to be coupled to said detachably mounted flange;

wherein said detachably mounted flange does not contact liquid to be handled by the pump.

6. The full-circumferential flow pump according to claim 5, wherein said seal surface is formed on said nozzle.

7. The full-circumferential flow pump according to claim 5, further comprising an intermediate ring interposed between said nozzle and said detachably mounted flange, wherein said seal surface is formed on said intermediate ring.

8. The full-circumferential flow pump according to claim 5, wherein said detachably mounted flange has a rigidity greater than that of said pump casing.

* * * * *